(12) United States Patent
Wohlfeld et al.

(10) Patent No.: US 8,876,408 B2
(45) Date of Patent: Nov. 4, 2014

(54) OPTICAL CONNECTORS AND A METHOD OF PRODUCTION THEREOF

(75) Inventors: Denis Wohlfeld, Edingen (DE); Karl-Heinz Brenner, Mannheim (DE); Ulrich Brüning, Neustadt a. d. Weinstraβe (DE)

(73) Assignee: Ruprecht-Karls-Universität Heidelberg, Heidelberg (DE)

( * ) Notice: Subject to any disclaimer, the term of this patent is extended or adjusted under 35 U.S.C. 154(b) by 593 days.

(21) Appl. No.: 13/004,590

(22) Filed: Jan. 11, 2011

(65) Prior Publication Data
US 2011/0262081 A1    Oct. 27, 2011

(30) Foreign Application Priority Data

Apr. 23, 2010 (DE) .......................... 10 2010 018 248
Nov. 30, 2010 (DE) .......................... 10 2010 052 779

(51) Int. Cl.
*G02B 6/36* (2006.01)
*G02B 6/42* (2006.01)

(52) U.S. Cl.
CPC ............ *G02B 6/4214* (2013.01); *G02B 6/4243* (2013.01); *G02B 6/423* (2013.01); *G02B 6/4255* (2013.01)
USPC ......................................................... 385/88

(58) Field of Classification Search
None
See application file for complete search history.

(56) References Cited

U.S. PATENT DOCUMENTS

| | | | |
|---|---|---|---|
| 5,168,537 A | 12/1992 | Rajasekharan et al. | |
| 5,369,529 A | 11/1994 | Kuo et al. | |
| 5,764,832 A | 6/1998 | Tabuchi | |
| 6,115,521 A * | 9/2000 | Tran et al. | 385/52 |
| 6,389,202 B1 | 5/2002 | Delpiano et al. | |
| 6,488,417 B2 * | 12/2002 | Kropp | 385/88 |
| 6,491,447 B2 * | 12/2002 | Aihara | 385/92 |
| 6,869,229 B2 * | 3/2005 | Reedy et al. | 385/88 |
| 6,921,214 B2 * | 7/2005 | Wilson | 385/89 |
| 7,118,293 B2 * | 10/2006 | Nagasaka et al. | 385/89 |
| 7,218,804 B2 | 5/2007 | Brenner et al. | |
| 7,547,151 B2 * | 6/2009 | Nagasaka | 385/93 |
| 2001/0004413 A1 | 6/2001 | Aihara | |
| 2008/0031575 A1 * | 2/2008 | Rittner | 385/88 |

FOREIGN PATENT DOCUMENTS

| | | |
|---|---|---|
| DE | 43 23 681 A1 | 1/1995 |
| DE | 10 2004 038 530 B3 | 1/2006 |
| EP | 2 136 228 A1 | 12/2009 |
| JP | 2003-131088 | 5/2003 |

OTHER PUBLICATIONS

Office Action issued Nov. 22, 2010, in German Patent Application No. 10 2010 018 248.6-51, filed Jul. 29, 2010 (without English-language Translation).

\* cited by examiner

*Primary Examiner* — Tina Wong
(74) *Attorney, Agent, or Firm* — Oblon, Spivak, McClelland, Maier & Neustadt, L.L.P.

(57) ABSTRACT

The invention relates to a method for producing an active optical connection with an optoelectronic element and a light deflection means for light deflection between the optoelectronic element and an optical waveguide arranged transversely with respect to the beam direction of said element. In this case, it is provided that a carrier substrate for the optoelectronic element is arranged in a highly precisely repeatably positioning machine, in particular a flip-chip machine, the optoelectronic element is mounted on the substrate by a or the highly precisely repeatably positioning machine and a curable, moldable compound is applied over the optoelectronic element, and the moldable compound is molded by a mold for molding light deflection means, said mold being moved by a or the highly precisely repeatably positioning machine, and at the earliest thereafter the substrate is removed from the or a highly precisely repeatably positioning machine.

10 Claims, 2 Drawing Sheets

OPTICAL CONNECTORS AND A METHOD OF PRODUCTION THEREOF

CROSS-REFERENCE TO RELATED APPLICATIONS

This application is based upon and claims the benefit of priority from prior German Patent Application Nos. 10 2010 018 248.6, filed Apr. 23, 2010 and 10 2010 052 779.3, filed Nov. 30, 2010, the entire contents of both of which are incorporated herein by reference.

BACKGROUND OF THE INVENTION (a) Field of the Invention

The present invention concerns what is claimed in the preamble, and accordingly relates to active optical connections.

(b) Description of the Related Art

Data processing increasingly requires that large volumes of data can be transmitted between different locations; this can be the case within a computer, for instance between the CPU and memories or between the motherboard and hard disks, but also within local networks, for example between workstation computers and local company servers, and also for connection to the Internet. Data transmission is additionally important from those locations at which large volumes of data arise to those locations where they are processed. Experiments appertaining to high-energy physics using particle detectors shall be mentioned by way of example.

The data transmission can take place purely electrically using electrical cables; however, transmission is also possible by means of optical signals. In this case, light signals can be radiated into an optical waveguide, such as a multi-mode fiber, by a modulated light transmitter, for example a laser diode modulated in accordance with the data signals, and can be transmitted by the optical waveguide to a light receiver, such as a photodiode, where the light signals can be converted into electrical signals again and processed. In this case, the desired high transmission rates of optical data connections require that the light generated by the light transmitter is modulated with high frequency and is efficiently coupled into the optical waveguide in order to obtain a good signal-to-noise ratio.

In the case of rapidly modulatable optoelectrical transmission elements such as laser diodes, therefore, it is also necessary to take account of the emission behavior for the quality of the optical connection. What is important is that a greatest possible portion of the light emitted by an active optical transmission element is coupled into the optical waveguide, that is to say typically the multi-mode optical fiber. This is difficult primarily in the case of so-called surface emitting semiconductor lasers, Vertical Cavity Surface Emitting Lasers, VCSELs. The latter emit the laser beam generally in the direction of their surface normals, while a high efficiency of coupling the laser light into the optical waveguide fibers requires that the end faces thereof are arranged transversely with respect to the direction of the beam. On account of the difficult mounting and the typically limited space available, this is generally prohibited, however, if the active optoelectronic transmission element is mounted in a planar fashion on a plane such as a circuit board or some other carrier substrate, because the fiber would have to be perpendicular to the carrier substrate for this purpose.

Since the arrangement of the active optical transmission element perpendicularly to the circuit board is generally likewise not considered, both for space reasons and for mounting reasons, it has already been proposed to arrange a VCSEL or some other optoelectronic element in a planar fashion on a carrier substrate and to conduct away the light parallel to the substrate by means of a suitable optical waveguide fiber; it has likewise already been proposed to provide a deflection means such as a mirror element between the active optoelectronic element and the optical waveguide fiber.

The deflection means can be formed by a reflector. A method and a device for producing an optical connection between an optoelectronic component and an optical waveguide are known, in particular, from DE 10 2004 038 530. Reference is likewise made to the dissertation by Denis WOHLFELD. The cited documents are fully incorporated by reference in the present application.

DE 43 23 681 A1 discloses an arrangement for coupling at least one optical waveguide fiber to at least one optical reception or transmission element and a method for producing the arrangement. In this case, optical waveguide fiber and optical element are intended to be arranged on opposite sides of a common carrier. The optical waveguide fiber is assigned a light beam deflection arrangement in the region of the optical axis. An optically transparent carrier such as a silicon substrate is intended to be used, wherein a guide structure for the optical fiber and a holding structure are intended to be incorporated on opposite sides, which can be done by etching. The fitting of alkali-containing glass to the carrier is mentioned.

JP 2003 131088 discloses an optical module that is intended to provide an optical path between an optical element and an optical fiber. The fiber end and other optical waveguide bodies are intended to be arranged in a V-shaped groove provided on a carrier.

U.S. Pat. No. 5,168,537 discloses a method and a device for coupling light between a waveguide and an optoelectronic device, in which a terminating block has embedded therein a multiplicity of collimating cylindrical lenses protruding from a first end of the block. A plurality of fibers are arranged longitudinally with respect to the lenses and likewise embedded into the block. A deflection block receives this end part and deflects light onto optoelectronic elements. The arrangement is large, has large distances between fiber ends and optoelectronic element and thus has considerable disadvantages.

U.S. Pat. No. 6,389,202 discloses an arrangement in which the optical power emitted by a VCSEL is intended to be coupled into a fiber in the best possible way, that is to say with maximum power transfer. For this purpose, carrier grooves are etched in a silicon substrate, for example by plasma ion etching. A glass cover is intended to be arranged over the grooves, where fibers are then intended to be arranged with high accuracy in the grooves. The glass layer is intended to be particularly smooth, which is intended to make it possible to use the technique of flip-chip bonding for fitting optical components. Inter alia, VCSEL and the like are mentioned among such optical components. A high alignment outlay is still required during mounting in this case.

U.S. Pat. No. 5,764,832 explains that the outlay for mounting optical fibers on plug connectors for optoelectronic communication is very high. It is proposed to provide a groove in a carrier substrate, to form a flat surface on the carrier substrate with the groove and to position an optical component on the flat surface and then to position an optical fiber in the groove. The positioning is intended to be monitored visually. This, too, involves high outlay.

SUMMARY OF THE INVENTION

There is a need to provide a cost-effective, highly integrated optoelectronic connection which can be produced with only little outlay.

This object is achieved in the manner claimed in independent form. Preferred embodiments are found in the dependent claims.

Consequently, a first basic concept proposes a method for producing an active optical connection with an optoelectronic element and a light deflection means for light deflection between the optoelectronic element and an optical waveguide arranged transversely with respect to the beam direction of said element. In this case, it is provided that a carrier substrate for the optoelectronic element is arranged in a highly precisely repeatably positioning machine, in particular a flip-chip machine, the optoelectronic element is mounted on the substrate by a or the highly precisely repeatably positioning machine and a curable, moldable compound is applied over the optoelectronic element, and the moldable compound is molded by a mold for molding light deflection means, said mold being moved by a or the highly precisely repeatably positioning machine, and at the earliest thereafter the substrate is removed from the highly precisely repeatably positioning machine.

Accordingly, a first essential insight is that the light deflection means are molded, to be precise using a highly precisely repetitively movable machine such as has already been available for a long time in a straightforward manner in industry. By virtue of the fact that a curable moldable compound is applied over an optoelectronic element positioned previously by said machine, for example, in particular preferably even the same arm of said machine, and is molded by means of the machine, a highly precise correspondence of the critical relative position of light deflection means and optoelectronic element is ensured without high outlay. However, it should be explicitly be pointed out that the molding does not have to be effected necessarily by the same machine or directly after VCSEL mounting, rather it is merely necessary to ensure a high repetition accuracy during the positioning. This can be done by changing the tool head on the mounting arm, by using a second mounting arm on a placement machine, such that a first arm is used for the VCSEL mounting and a second arm is used for the molding of an applied compound. In this case, an extremely high accuracy does not have to be used for application itself, provided that the presence of small amounts of excess material can be afforded tolerance. It would be possible firstly to populate a series of circuit boards and then bring about the molding of the compound using the same or some other highly precisely repetitively positionable machine.

In the present case, highly precisely repetitively positionable is understood to mean that an accuracy that suffices for purposes of coupling-in and/or coupling-out can be obtained. This means, with conventional technology, that an accuracy of better than 50 µm, preferably better than 10 µm, repeatability has to be ensured. If appropriate, circuit board fixing and/or alignment with corresponding precision is required for this purpose.

The arrangement according to the invention allows the optical waveguide fibers to be arranged very close to the optoelectronic elements. This is particularly expedient because, as a result, the coupling-in efficiency can also be significantly increased and, consequently, a particularly good signal-to-noise ratio is obtained, which in turn increases the data rates that can be transmitted. The close spatial proximity between optical waveguide fibers and optical element, the precise alignment during the production of optical waveguides relative to optoelectronic element and the advantages afforded by suitable structuring of the light deflection means are combined in this case. The present invention entails a significant improvement in the coupling efficiency; the efficiency that can be obtained is approximately 50% higher by comparison with the property right of one of the co-inventors.

It should be mentioned that it is possible and preferred for the optical waveguide fibers to be concomitantly introduced directly during the structuring of the optical elements, in particular by inserting the fibers into the die prior to molding. This immediate embedding facilitates, in particular, the provision of an index-matched structure since, as a result of the fibers being molded in during structure formation, index-matched material for the index matching effected after fiber introduction can no longer flow over mirror and/or light deflection structures, and problems, at any rate significant problems, with bubble formation no longer occur either. Thus, in particular, mass production is considerably simplified.

It is possible for at least one, preferably a plurality of photodiodes to be provided as optoelectronic element, that is to say for a (also at least one) receiver to be provided as optoelectronic element. In such a case, the beam direction is typically defined as the surface normal with respect to the photosensitive surface.

Alternatively and/or additionally, it is also possible for at least one light-emitting diode to be provided as optoelectronic element, preferably a laser diode such as a VCSEL, wherein the latter is mounted in such a way that the emitted light beam is radiated, that is to say emitted, away from the carrier substrate, in particular perpendicularly away from the carrier substrate. It is possible, with the method, to provide alongside one another both one or a plurality of photodiodes or other light-sensitive optoelectronic elements and one or a plurality of light-emitting elements, in particular light-emitting, preferably rapidly modulatable diodes. The common arrangement of light receivers and light transmitters makes it possible to provide an optoelectronic connection that operates in two directions, which has the effect that the data transmission protocols which can be used with a plug produced according to the invention are made practically free of restrictions. The multiplicity of elements to be provided, if appropriate, can be arranged parallel to one another.

It should be pointed out that the arrangement of optical fibers becomes possible in a straightforward manner even in structurally small plugs. In addition, attention is drawn to the possibility of optical fibers being directly molded in, that is to say fibers being enclosed into the structure compound during the molding of the structures.

It should be pointed out that the positioning accuracies which can be obtained with flip-chip machines are high, which ensures just a low optical loss.

It is possible to achieve coupling efficiencies of up to 96% with the present invention by all the functions such as mount, insertion funnel, fiber fixing and optimized mirror surface being integrated into a single, jointly produced and aligned microstructure which is replicated directly on the active components or multi-chip modules. If appropriate, even the fibers themselves can be concomitantly molded in. This not only contributes to a further improved coupling efficiency, but lowers the overall costs further and is therefore particularly preferred.

It is moreover readily possible to ensure that the light deflection means acquires a form that optimizes the energy transfer. In this case, the form optimization is preferably effected such that an optimum energy input is achieved in the case of typical VCSEL emission patterns. The monolithic coupling structure according to the invention thus yields particularly high efficiencies. The invention therefore enables overall significantly improved active optical connections in conjunction with reduced costs.

The light deflection means will typically be designed for coupling light into or out of the end face of an optical waveguide fiber, in particular a multi-mode fiber. Therefore, it is not necessary to provide a lateral coupling into an optical fiber. The design of the optical waveguide as a multi-mode fiber facilitates the coupling-in owing to the larger fiber diameter. These, too, can be molded in, which is preferred.

The active optical connection produced according to the method according to the invention can be realized in an active optical cable and/or in an optocoupler.

It should be pointed out that an active optical cable is understood to mean a connection in which at least some of the data to be transmitted are fed in as electrical data, converted into optical signals, transmitted as optical signals and converted back again into electrical data signals; it may be considered likewise to be sufficient if electrical signals are converted into optical signals, or vice versa, at least at one end. Moreover, it is possible to transport alongside the optical signals, if appropriate, also electrical signals and/or electrical energy along the cable. This makes it possible, inter alia, to construct long connections with active optical cables in which repeaters, signal conditioners, externally supplied switches, routers and hubs and the like are provided, without a separate power supply infrastructure having to be provided. This may be of significant advantage in the case of long range transmissions. In this case, an electrical power supply can be integrated for example via cables running parallel to the optical waveguides, or mechanically protective hollow wire braidings, without high outlay, especially since generally only low DC voltages are required.

It is also possible, moreover, to provide optocouplers as active optical connection, for instance, in order, in a limited spatial area such as within a computer, on a motherboard or the like, to provide an optical high-speed connection and/or to enable a direct electrical isolation of transmitter and receiver at high to very high data transmission rates.

A printed circuit or a multi-chip module can be used as carrier substrate. This is advantageous by comparison with carrier substrates composed of silicon, into which optical elements have to be structured with extremely high outlay using the methods of silicon processing. The use of printed circuits is particularly cost-effective and, moreover, makes it possible to obtain very high packing densities, which also applies to the use of multi-chip modules.

The compound applied as moldable, curable compound over the optoelectronic element is preferably a UV-curable compound. The UV curing makes it possible for the compound molded by the mold moved by the flip-chip to cure very rapidly and with simple means. As a result, very short production cycle times can be obtained just by setting suitable parameters of the UV-curable compound. The fact that curing methods are possible, for example by IR irradiation, heating using heating elements, etc., should be mentioned.

It should be pointed out that it is possible and preferred, but not mandatory, to perform a functional test during the mounting of the optoelectronic elements. In the case of defects or deviations from a permissible standard, an element can be discarded as a reject, if appropriate, actually prior to a further processing and, in particular, molding of the light deflection means. This early quality control lowers the production costs further overall. It should be pointed out that the same compounds used for forming the light deflection means can also be used for fixing the optical waveguide fibers. This reduces stock keeping costs and provides for a homogeneous behavior over a component, to be precise even when the optical waveguide fibers are not simultaneously concomitantly molded in.

The moldable compound can preferably be molded by a PDMS die. It should be pointed out that PDMS molding is known per se; reference should be made to corresponding documents such as textbooks and Lexica which are concerned with the use of polydimethylsiloxane (PDMS) dies for molding relief surfaces. The PDMS die used can, in particular, be molded from an intermediate master which, for its part, is produced by photolithography. As suitable photoresist for UV depth lithography such as can be employed for producing the intermediate master, mention may be made of, in particular, commercially available SU-8 epoxy resin, for example EPON-SU-8 epoxy resin from Shell Chemical. Such photoresists make it possible to realize high mechanical stability, UV sensitivity, in a straightforward manner sufficiently high aspect ratios and thicknesses of up to 2 mm, as is known per se in the art.

Moreover, it should be pointed out that, alongside PDMS dies, other molding tools are also appropriate, for example dies composed of metal or plastic. It should furthermore be pointed out that, if appropriate, other production methods for a master mold are possible besides the photolithography method. Merely by way of example, mention may be made of high-precision milling, for instance. Direct shaping without an intermediate master shall also be disclosed as a possibility.

During the production of the intermediate master, possible shrinking of the mold during curing can readily be taken into account, such that no adverse effects for the completed optical connection occur as a result.

The use of such materials makes it possible to form three-dimensionally shaped light deflection means by which light is concentrated or collimated in between optoelectronic element and optical waveguide fiber as necessary in order to transfer the light from the optical fiber into an optoelectronic receiver particularly well or to couple a high coupling-in efficiency of the light emitted by an optoelectronic transmitter, such as a VCSEL, into a (multi-mode) fiber particularly well.

It is possible and particularly preferred if at least one of the optoelectronic elements is fitted on a substrate or some other carrier by means of wire bonding technology and regions in which the wire bonds are at least partially enclosed are provided in the mold for structuring the UV-curable compound or compound curable in some other way. This considerably increases the structural stability of the entire connection.

In one particularly preferred variant, the moldable compound is cured whilst still in the flip-chip machine, which can be done both thermally and using UV radiation. It is possible to combine both curing variants, for instance by the compound being additionally heated during the UV curing, which can be done by application of heating voltage to electrical heating elements or by suitable, heating electromagnetic radiation being radiated into the curable compound, for example by means of UV light or IR light or the like. It should be pointed out that, if appropriate, multi-component mixtures can be used which cure rapidly after mixing, without the need for further activation.

Protection is also claimed for an active optical connection, in particular a cable or an optocoupler, with at least one optoelectronic element and a light deflection means for deflecting light between the at least one optoelectronic element and an optical waveguide arranged transversely with respect to the beam direction of said element, wherein the optoelectronic element is applied by means of wire bonding on a substrate and the light deflection means is formed from polymerized material which integrally encloses at least substantial parts of the wire bonding connection, and is provided in particular with an optical fiber, in particular a light-conducting multi-mode fiber as optical conductor and preferably in particular furthermore integrally with a fiber feed funnel that opens at least in one plane, preferably in two mutually perpendicular directions.

Mounting is simplified further by the use of fiber feed funnels. This applies particularly when feed funnels that open in two planes are used. It is possible to produce said fiber feed funnels that open in two mutually perpendicular directions by a method as described above, in particular by guiding the light-conducting fiber in a channel spaced apart from a carrier substrate, and realizing the funnel-like opening in the plane perpendicular to the substrate by an oblique plane running in a direction toward the substrate, or the like, that is to say by choosing a funnel extension on one side for said plane. Where the fibers are already introduced into the die for molding, it is also advantageous if a funnel-shaped die geometry is chosen. This facilities the insertion of the fibers into the die prior to molding.

It is preferred if the light deflection means are molded from polymerizable material and by a matrix, that is to say a die or the like.

BRIEF DESCRIPTION OF THE SEVERAL VIEWS OF THE DRAWINGS

The invention is described below merely by way of example with reference to the drawing, in which.

DETAILED DESCRIPTION OF THE INVENTION

Figure 1:
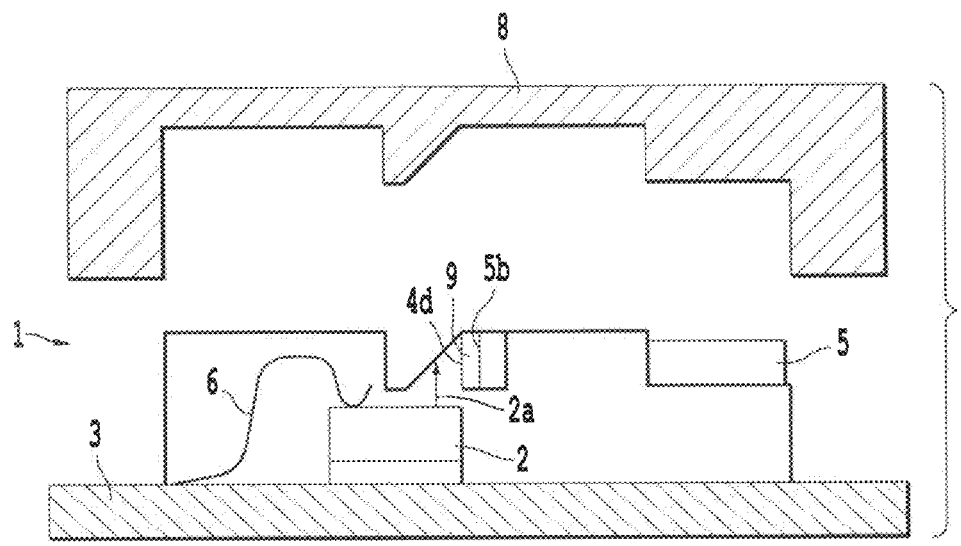
FIG. 1 illustrates an active optical connection on a multi-chip module in side view together with a die that molds light deflection means.

According to FIG. 1, an active optical connection, designated generally by 1, comprises an optoelectronic element 2 on a carrier 3, a light deflection means 4 and an optical fiber 5 arranged transversely with respect to the beam direction 2a of the optoelectronic element 2, wherein the optoelectronic element 2 is fitted by means of wire bonds 6 on the substrate 3 and the light deflection means 4 is formed from polymerized material which integrally encloses at least parts of the wire bonding connection 6 and wherein, as possible but not absolutely necessary, the light deflection means 4 is formed here integrally with fiber feed funnels 4a1, 4a2 that open here in one plane in order to feed the optical fibers in the direction of the light deflection means during mounting.

In the present case, although this is not absolutely necessary, the active optical connection 1 is formed in the plug of an active optical element, said plug comprising the multi-chip module. In the present exemplary embodiment, the active optoelectronic element is a VCSEL 2, which is driven via the wire bonding connections 6 and emits light perpendicularly toward the top, that is to say that a so-called "top emitter" is involved here as possible, but not mandatory. The substrate 3 is a conventional arrangement for multi-chip modules which is conventionally populated with further electrical circuits and can be electrically contact-connected as usual, without the need for more detailed discussion in this respect here.

In the present exemplary embodiment, the light deflection means 4 comprises a totally reflecting surface 4d, onto which the beam emitted by the VCSEL into the molding compound passes back and which, in contrast to what is shown in the figure for reasons of simpler graphical illustration, need not necessarily be planar, but rather is typically shaped in a curved fashion, to be precise like a concave mirror in such a way as to result in a maximum coupling of energy into an optical waveguide fiber 5.

Figure 2:
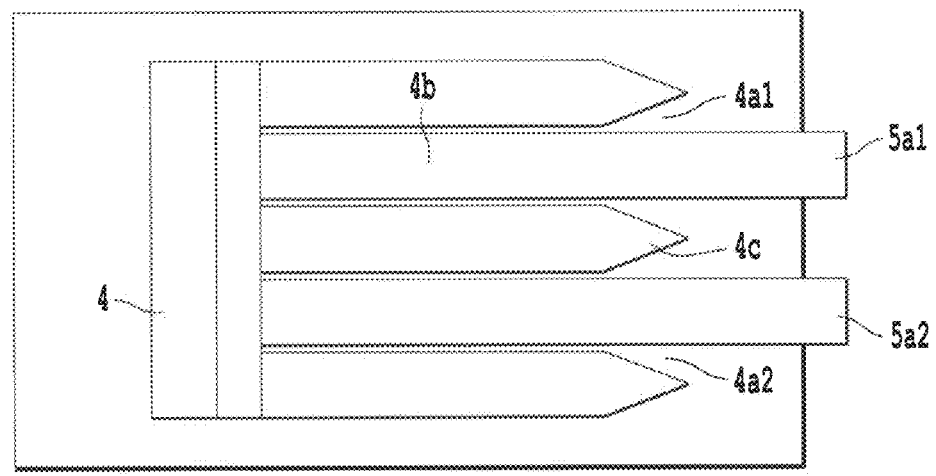
FIG. 2 illustrates a plan view of the multi-chip module with the active optical connection from FIG. 1.

The light deflection means 4 is formed integrally with the inclusions for the wire connections that make contact with the VCSEL, wire bonds 6, and the fiber feed channels 4b with terminal feed funnel openings 4a, to be precise from UV-curable epoxy resin which, by means of a PDMS intermediate die 8, as will be described below, is structured in a flip-chip machine and then cured in the machine. In the present exemplary embodiment, the optical waveguide fibers 5 are multi-mode fibers having a diameter of here 32.5 μm and a distance between two adjacent fiber centers of 250 μm. The partition wall 4c lying between two optical fibers 5a1, 5a2 (cf. FIG. 2) is likewise formed integrally with the light deflection means 4 and suffices to avoid considerable crosstalk, that is to say significant mutual radiating of light in between the fibers; it should be pointed out that each optical fiber 5a1, 5a2 is assigned a dedicated VCSEL which can be driven separately, that in a typical exemplary embodiment a plurality of optical fibers, for example approximately 16 optical fibers or more, can be provided, and that, moreover, as active optoelectronic elements it is possible to provide not only light transmitters but also light receivers, such as fast photodiodes, the signals of which are conditioned in a customary manner on the multi-chip module and which, as shown for the VCSEL in FIG. 1, can likewise be contact-connected by means of wire connections, comparable to reference numeral 6 for the VCSEL illustrated, that are largely embedded in particular in the plastics compound of the light deflection means 4.

The light deflection means 4 has a straight surface 4d relative to the end face 5b of each optical fiber 5. The interspace between the end face 5b of the optical fiber 5 and the region 4d is filled with a refractive-index-matched material 9, which can substantially be the same epoxy resin that is also used for forming the light deflection means.

The arrangement can be produced as follows:

Firstly, a multi-chip module is populated in a customary manner.

The optoelectronic elements 2 are then mounted, to be precise using a highly precisely repeatably positionable machine, here a flip-chip machine, such as is known per se. The contact-connection of the optoelectronic elements can be performed here using wire bonds, although this is not mandatory; other connection possibilities may likewise be mentioned as a possibility, particularly for bottom emitter VCSELS. The height of the upper edge of the optoelectronic element is typically less than 200 μm; together with the deflection mirror surface 4 and the further regions this results in a total construction height above the substrate surface of typically less than 0.3 mm.

After the mounting of the optoelectronic elements in the flip-chip machine, while the substrate remains in said machine, a sufficient amount of UV-curable compound for forming the light deflection means 4 is applied over the optoelectronic elements and then the UV-curable compound is molded by a PDMS die, fitted to a mounting arm of the flip-chip machine, in the manner required by the configuration of the light deflection means, the web walls, introduction funnels. For this purpose, the PDMS die is molded from an original master produced by methods of depth lithography, and can be used repeatedly for producing a large number of plug connectors without any problems.

Depending on the moldable compound used, the die can be removed and then curing can be performed, or curing can be performed with the die 8 still applied. After the removal of the die, the fibers 5 can be inserted into the channels, which is readily possible through the funnel-shaped extension at the insertion end. The interspaces between the end face 5b of the individual fibers and the perpendicular surface 4d in front of the light deflection means 4 are then filled with a refractive-index-matching compound, which is likewise cured, which simultaneously fixes the optical waveguide fibers.

An active optical connector that permits high data transmission rates is provided with a high cycle frequency in this way.

While a preferred variant of the production method was described above, variations in respect thereof are readily possible. Thus, in the exemplary embodiment it was described that the application and molding of the compound are intended to be effected directly after the population of the circuit board; however this is not mandatory, provided only that a sufficiently high positioning repeatability is ensured.

Furthermore, it was described above that the molding compound is structured for the introduction of fibers. This is not mandatory, however. Rather, it is also possible to apply the molding compound together with the fibers. For this purpose, fibers are not introduced into the structure after the production of said structure, but instead are already introduced into the die used for molding the structure. This can be achieved, with modification of the method described above, as follows:

The prefabricated fibers are introduced into the die, then the die is filled with, for example, UV-curable compound and die and circuit board are then guided toward one another, such that the fiber together with mount and mirror is printed directly onto the components. This is done once again in a highly precise, reproducible manner, for example as discussed above, using a flip-chip machine. In this way, the volume between optical fiber end face and light deflection means is advantageously already filled during production.

Figure 3:
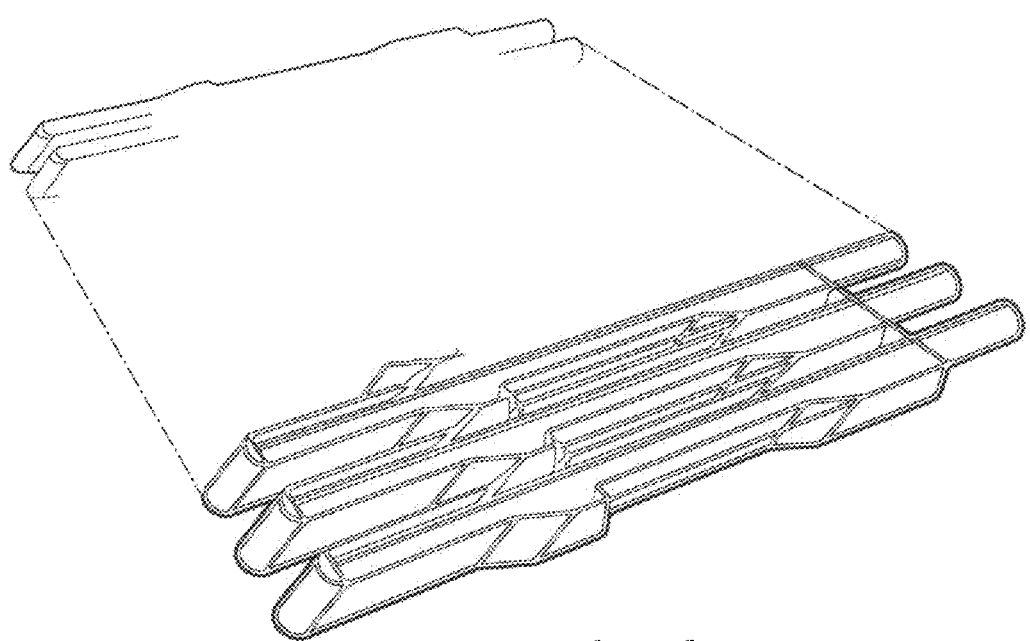
FIG. 3 illustrates a plan view of a structure produced with molded-in fibers.

It is possible to realize this with a die which contains channels spaced apart by a distance of 250 μm, for example, said channels being wide enough to accommodate customary fibers, and at the same time, with an area utilization of 45%, for example, after molding for light-deflecting reflectors, utilizes well the existing space for a high integration density. A corresponding structure which can be produced in this way is shown in FIG. 3.

The invention claimed is:

1. A method for producing an active optical connection with an optoelectronic element and a light deflection means for light deflection between the optoelectronic element and an optical waveguide arranged transversely with respect to the beam direction of said element, wherein a carrier substrate for the optoelectronic element is arranged in a highly precisely repeatably positioning machine, in particular a flip-chip machine, the optoelectronic element is mounted on the substrate by a or the highly precisely repeatably positioning machine and a curable, moldable compound is applied over the optoelectronic element, and the moldable compound is molded by a mold for molding light deflection means, said mold being moved by a or the highly precisely repeatably positioning machine, and at the earliest thereafter the substrate is removed from the or a highly precisely repeatably positioning machine.

2. The method as claimed in claim 1, wherein at least one photodiode is provided as optoelectronic element, the beam direction of which is the surface normal with respect to the photosensitive surface, and/or at least one light-emitting diode, preferably a laser diode, in particular a VCSEL, is provided, which is mounted such that its light beam is generally emitted perpendicularly away from the carrier substrate or toward the latter.

3. The method as claimed in claim 1, wherein the light deflection means is designed for coupling light into and/or out of the end face of an optical fiber, in particular of a multi-mode fiber, and an active optical cable and/or an optocoupler is provided as optical connection, wherein the optical waveguide fibers are in particular concomitantly molded in.

4. The method as claimed in claim 1, wherein a printed circuit and/or a multi-chip module is used as carrier substrate.

5. The method as claimed in claim 1, wherein a UV-curable compound is applied.

6. The method as claimed in claim 1, wherein the moldable compound is molded by a PDMS die, which, in particular, is molded from an intermediate master produced by depth lithography.

7. The method as claimed in claim 1, wherein at least one optoelectronic element is fitted by wire bonding technology and regions for at least partially enclosing the wire bonding regions in the moldable compound are provided in the mold.

8. The method as claimed in claim 1, wherein the moldable compound is cured, in particular thermally and/or by means of UV, before the carrier substrate is removed from the flip-chip machine.

9. An active optical connection, comprising:
   at least one optoelectronic element; and
   a light deflection means for deflecting light between the at least one optoelectronic element and an optical waveguide arranged transversely with respect to the beam direction of said element,
   wherein the optoelectronic element is connected by means of wire bonding on a substrate and the light deflection means is formed from polymerized material which embeds at least substantial parts of the wire bonding connection, and is provided in particular with an optical fiber, in particular a light-conducting multi-mode fiber as optical conductor and preferably in particular furthermore integrally with a fiber feed funnel that opens at least in one plane, preferably in two mutually perpendicular directions.

10. The active optical connection as recited in claim 9, wherein the light deflection means is formed from polymerizable material and is molded by a matrix.

\* \* \* \* \*